(12) United States Patent
Swaine

(10) Patent No.: US 11,507,515 B1
(45) Date of Patent: Nov. 22, 2022

(54) MEMORY MANAGEMENT UNIT WITH ADDRESS TRANSLATION CACHE

(71) Applicant: Arm Limited, Cambridge (GB)

(72) Inventor: Andrew Brookfield Swaine, Sheffield (GB)

(73) Assignee: Arm Limited, Cambridge (GB)

(*) Notice: Subject to any disclaimer, the term of this patent is extended or adjusted under 35 U.S.C. 154(b) by 0 days.

(21) Appl. No.: 17/361,822

(22) Filed: Jun. 29, 2021

(51) Int. Cl.
 *G06F 12/0891* (2016.01)
 *G06F 12/0871* (2016.01)
 *G06F 12/02* (2006.01)
 *G06F 12/1045* (2016.01)

(52) U.S. Cl.
 CPC ...... *G06F 12/0891* (2013.01); *G06F 12/0292* (2013.01); *G06F 12/0871* (2013.01); *G06F 12/1054* (2013.01); *G06F 12/1063* (2013.01)

(58) Field of Classification Search
 CPC ............ G06F 12/0292; G06F 12/0871; G06F 12/0891; G06F 12/1054; G06F 12/1063
 See application file for complete search history.

(56) References Cited

U.S. PATENT DOCUMENTS

2019/0294551 A1* 9/2019 Abhishek Raja ... G06F 12/1027

* cited by examiner

*Primary Examiner* — Aracelis Ruiz
(74) *Attorney, Agent, or Firm* — Leveque Intellectual Property Law, P.C.

(57) ABSTRACT

The present disclosure advantageously provides a memory management unit and methods for invalidating cache lines in address translation caches. The memory management unit has one or more address translation caches, and each address translation cache has a plurality of cache lines. The memory management unit receives transactions from a source of transactions. The transactions include, inter alia, memory transactions and a set-aside translation transaction. The memory transactions include at least a first memory transaction and a last memory transaction, and each memory transaction includes the same virtual memory address and the same translation context identifier. The set-aside translation transaction also includes the same virtual memory address and the same translation context identifier. In response to receiving the set-aside translation transaction, the memory management unit deallocates each cache line that stores an address translation for the same virtual memory address and the same translation context identifier.

23 Claims, 9 Drawing Sheets

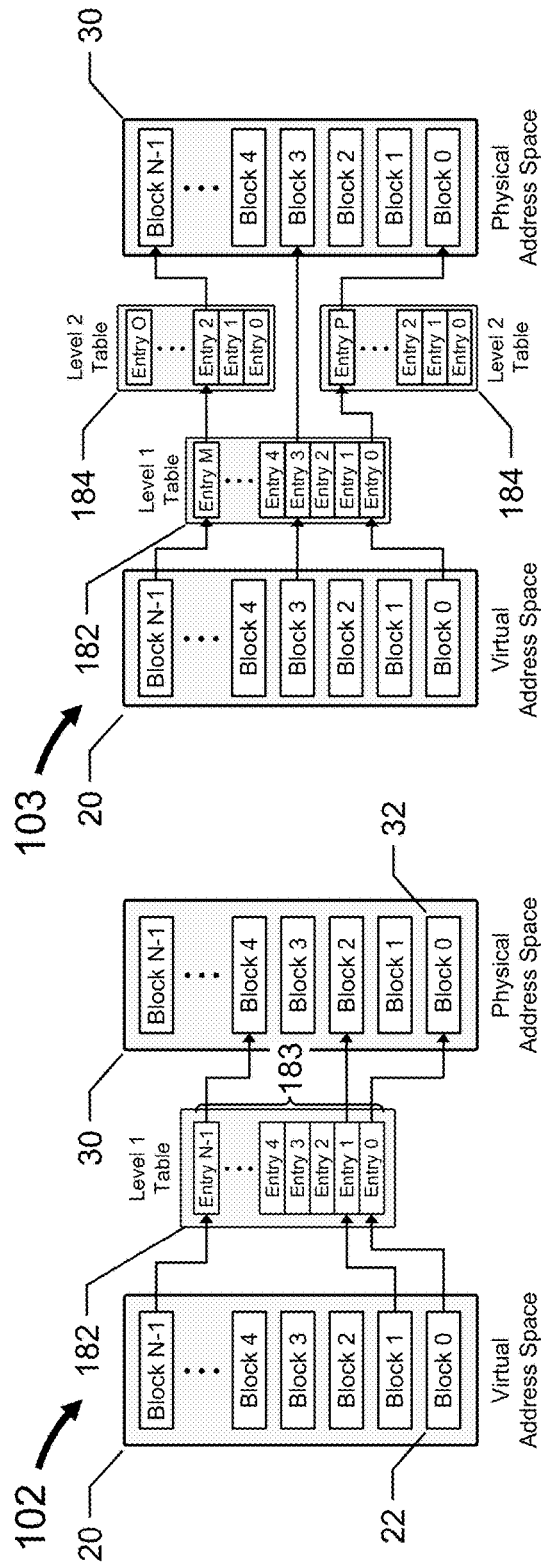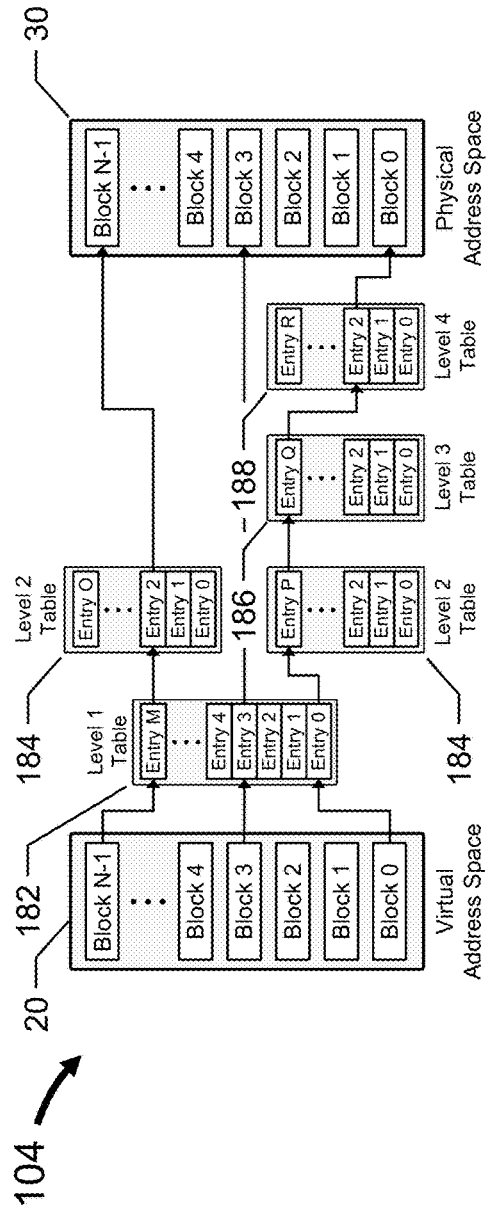
FIG. 2A
FIG. 2B
FIG. 2C

MEMORY MANAGEMENT UNIT WITH ADDRESS TRANSLATION CACHE

BACKGROUND

The present disclosure relates to a data processing system. More particularly, the present disclosure relates to a memory management unit for a data processing system.

A data processing system may include a system-on-chip (SoC) with various components that are connected by an interconnect. Generally, certain components process data, such as processors (e.g., central processing units or CPUs), accelerators (e.g., graphics processing units or GPUs), etc., while other components transfer data to and from memory or memory-mapped devices, such as, for example, memory controllers, input/output (I/O) controllers, network interface controllers (NICs), etc. These data transfer components are connected to on-chip or off-chip memory, peripheral devices, wired or wireless networks, etc. The interconnect provides the network infrastructure over which transactions between components are conveyed.

In many data processing devices (e.g., CPUs, GPUs, etc.), management software (e.g., an operating system or OS) operates in cooperation with a memory management unit (MMU) to control the view of memory that is presented to software applications that execute on the device. In order to provide a layer of abstraction from the physical memory map of the system used by memory and memory-mapped devices, each software application is presented with a virtual memory address space that is controlled by the management software. However, a virtual memory address that is used by the software application in a transaction must be translated into a physical memory address in order to be correctly conveyed to, and processed by, the memory or memory-mapped device.

The MMU intercepts the transactions and translates virtual memory addresses to physical memory addresses using one or more translation tables, such as page tables, that are stored in memory. The MMU may be a functional component within the data processing device, such as the MMU within a CPU, a GPU, etc., or the MMU may be provided as a standalone component coupled to the interconnect, which is generally known as a system memory management unit (SMMU). To improve address translation speed, the MMU and SMMU include one or more address translation caches, such as translation lookaside buffers (TLBs), that include a number of cache lines that store address translation data for a number of virtual memory addresses. Unfortunately, TLBs that store unneeded address translation data impede the address translation speed, performance and flexibility of the MMU and SMMU.

BRIEF DESCRIPTION OF THE DRAWINGS

FIGS. 2A to 2C depicts virtual to physical memory mapping, in accordance with an embodiment of the present disclosure.

DETAILED DESCRIPTION

Figure 1A:
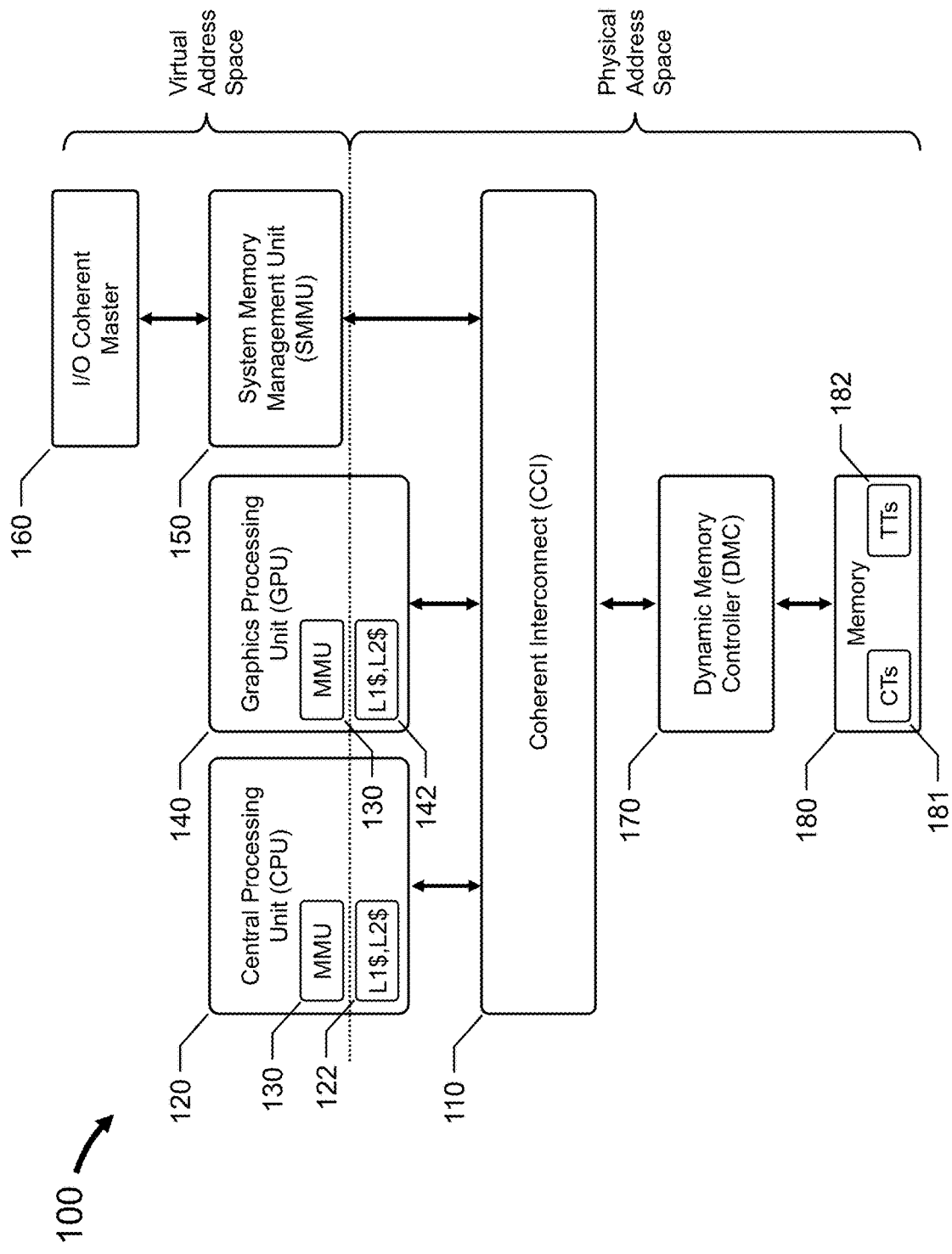
FIG. 1A depicts a block diagram for a system with a coherent domain, in accordance with an embodiment of the present disclosure.

Embodiments of the present disclosure will now be described with reference to the drawing figures, in which like reference numerals refer to like parts throughout.

Embodiments of the present disclosure advantageously provide a set-aside translation transaction that indicates to a memory management unit that a particular address translation is no longer needed by a source of transactions and may be removed from any TLB in which the address translation is stored. Accordingly, the set-aside translation transaction advantageously improves the speed, performance and flexibility of the memory management unit, such as an MMU and an SMMU.

In one embodiment, a method for invalidating cache lines in one or more address translation caches includes, at a source of transactions, sending transactions to a memory management unit having one or more address translation caches, each address translation cache having a plurality of cache lines, including sending memory transactions including at least a first memory transaction and a last memory transaction, each memory transaction including a same virtual memory address and a same translation context identifier; and sending a set-aside translation transaction including the same virtual memory address and the same translation context identifier. And, at the memory management unit, in response to receiving the set-aside translation transaction, deallocating each cache line that stores an address translation for the same virtual memory address and the same translation context identifier.

FIG. 1A depicts a block diagram for system 100, in accordance with an embodiment of the present disclosure.

System 100 includes coherent interconnect 110 coupled to one or more processors, such as CPU or CPU complex 120, one or more accelerators, such as GPU or GPU complex 140, SMMU 150, and one or more dynamic memory controllers (DMCs), such as DMC or DMC complex 170. SMMU 150 is coupled to one or more I/O coherent master devices 160, and DMC 170 is coupled to memory 180. Other components may also be provided. A CPU complex includes multiple CPUs 120 that are arranged in a cluster connected by a local interconnect, a GPU complex includes multiple GPUs 140 that are arranged in a cluster connected by a local interconnect, and a DMC complex includes multiple DMCs 170 that are arranged in a cluster connected by a local interconnect. Coherent interconnect 110 may be a cache coherent interconnect (CCI), such as the Arm CoreLink CCI-400 Cache Coherent Interconnect.

CPU 120 may be coupled to coherent interconnect 110 via an AMBA 5 CHI connection, GPU 140 may be coupled to coherent interconnect 110 via an ACE5-LiteDVM connection, I/O coherent master device 160 may be coupled to SMMU 150 via an ACE5-Lite connection, SMMU 150 may be coupled to coherent interconnect 110 via an ACE5-Lite connection, and DMC 170 may be coupled to coherent interconnect 110 via an ACE5-Lite connection; other connection protocols may also be used. AMBA 5 CHI refers to the Arm Advanced Microcontroller Bus Architecture (AMBA) 5 Coherent Hub Interface (CHI) architecture, ACE5 refers to the Arm AMBA AXI Coherency Extension (ACE) 5 architecture, AXIS refers to the Arm Advanced eXtensible Interface (AXI) 5 architecture, and ACE5-Lite-eDVM refers to the Arm AMBA ACE5-Lite Distributed Virtual Memory (DVM) architecture.

Coherent interconnect 110 is a communication system that transfers data among CPU 120, GPU 140, SMMU 150 (and I/O coherent master device 160), DMC 170 (and memory 180), etc. Coherent interconnect 110 employs a coherent bus protocol that maintains coherency between data in the respective caches and accessed by the requesters, i.e., processors, accelerators, I/O master devices, etc., which tracks requests for accesses to data from a given address and controls snooping of data in other caches when required for maintaining coherency. Certain components of system 100 may be classified as, associated with, or represented by, a particular type of interconnect protocol node, as discussed in more detail with respect to FIG. 1B. Coherent interconnect 110 may also include one or more system caches and snoop filters to store evicted data from requesters.

Generally, coherent interconnect 110 may include, inter alia, a shared or hierarchical bus, a crossbar switch, a packet-based serialized network-on-chip (NoC), etc. In one embodiment, coherent interconnect 110 has a crossbar topology that provides an ordered network with low latency, and may be particularly suitable for a small-sized interconnect with a small number of protocol nodes, switches and wire counts. In another embodiment, coherent interconnect 110 has a ring topology that balances wiring efficiency with latency, which increases linearly with the number of protocol nodes, and may be particularly suitable for a medium-sized interconnect. In a further embodiment, coherent interconnect 110 has a mesh topology that has more wires to provide greater bandwidth, is modular and easily scalable by adding more rows and columns of switches or routers, and may be particularly suitable for a large-sized interconnect.

In many embodiments, coherent interconnect 110 includes a coherent mesh network that includes multiple switches or router logic modules (routers) arranged in a two-dimensional rectangular mesh topology. In this example, the switches or routers are crosspoints (i.e., XPs). Each XP may connect up to four neighboring XPs using mesh ports, and may connect to one or two components (devices) using device ports. Additionally, each XP may support four CHI channels to transport data from a source device to a destination or target device.

In these embodiments, coherent interconnect 110 may have an architecture that includes three layers, i.e., an upper protocol layer, a middle network layer, and a lower link layer. The protocol layer generates and processes requests and responses at the protocol nodes, defines the permitted cache state transitions at the protocol nodes that include caches, defines the transaction flows for each request type, and manages the protocol level flow control. The network layer packetizes the protocol message, determines, and adds to the packet, the source and target node identifiers (IDs) required to route the packet over coherent interconnect 110 to the required destination. The link layer provides flow control between components, and manages link channels to provide deadlock free switching across coherent interconnect 110.

CPU 120 includes one or more cores, MMU 130 and one or more caches 122. More particularly, CPU 120 may include several caches 122, such as, for example, a level 1 data cache (L1$) for each core, a level 1 instruction cache (L1$) shared by two cores, a level 2 cache (L2$) shared by two cores, a level 3 cache (L3$) shared by all of the cores, etc.; L1 caches are small (e.g., 16 KB to 64 KB), L2 caches are larger (e.g., 1 MB to 2 MB) and L3 caches are the largest (e.g., up to 8 MB). Generally, CPU 120 executes computer programs or modules, such as an operating system, application software, other software modules, etc., stored within a memory, such as, for example, memory 180, to perform various functions for system 100, such as, for example, control, computation, input/output, etc. CPU 120 may include, for example, one or more Arm Cortex A, R and M processors.

GPU 140 includes one or more cores, MMU 130 and one or more caches 142. More particularly, GPU 140 may include several caches 142, such as, for example, level 1 data caches (L1$), level 1 instruction caches (L1$), level 2 caches (L2$), etc. Generally, GPU 140 is optimized to perform one or more specific functions, such as graphics processing, images and/or multimedia data, process digital signal data, process artificial neural network data, etc. GPU 140 may include, for example, one or more Arm Mali graphics processing units.

Conceptually, the memory address space for system 100 may be divided into a virtual address space and a physical address space. MMUs 130 and SMMU 150 bridge these address spaces by translating virtual memory addresses into physical memory addresses.

Generally, a process executing on CPU 120 or GPU 140 may issue a transaction to memory 180 (or another memory-mapped device), such as a memory read transaction, a memory write transaction, etc., that includes a virtual memory address, a TCI that identifies the process, and the transaction parameters. MMUs 130 intercept the transaction and translate the virtual memory address into a physical memory address using the translation table or tables 182 for that TCI. MMUs 130 typically store address translations in one or more TLBs, and searches these TLBs for a matching address translation prior to accessing the translation tables 182.

Similarly, a process executing on I/O coherent master device 160 may issue a transaction to memory 180 (or another memory-mapped device), such as a memory read transaction, a memory write transaction, etc., that includes a virtual memory address, a TCI that identifies the process executing on I/O coherent master device 160, and the transaction parameters. SMMU 150 intercepts the transaction and translates the virtual memory address into a physical memory address using the translation table or tables 182 for that TCI. SMMU 150 typically stores address translations in one or more TLBs, and searches these TLBs for a matching address translation prior to accessing the translation tables 182.

Cache 122 or 142 may be located in the physical address space and store physical memory addresses, data and/or instructions, such as a physically indexed physically tagged (PIPT) cache. Alternatively, cache 122 or 142 may be located in the virtual address space and cache virtual memory addresses data and/or instructions, such as a virtually indexed virtually tagged (VIVT) cache. Additionally, one or more TLBs of MMUs 130 may cooperate with cache 122 or 142 to create a hybrid cache that uses virtual memory address indexes with physical memory address tags, such as a virtually indexed physically tagged (VIPT) cache. Various combinations of caches 122 and 142 may be used by CPU 120 and GPU 140, respectively. For example, CPU 120 may include a VIPT L1 instruction cache, a PIPT L1 data cache, and a PIPT L2 cache. I/O coherent master device 160 typically does not include a cache due to coherency reasons.

DMC 170 includes a microprocessor, microcontroller, application-specific integrated circuit (ASIC), field-programmable gate array (FPGA), logic circuits, etc., and is configured to provide access to memory 180 through coherent interconnect 110, such as, for example, the Arm Core-Link Dynamic Memory Controller DMC-620. Memory 180 may include a variety of non-transitory computer-readable medium that may be accessed by the other components of system 100, such as CPU 120, GPU 140, I/O coherent master device 160, etc. For example, memory 180 may store data and instructions for execution by CPU 120, etc.

In various embodiments, memory 180 may include volatile and nonvolatile medium, non-removable medium and/or removable medium. For example, memory 180 may include any combination of random access memory (RAM), dynamic RAM (DRAM), double data rate (DDR) DRAM or synchronous DRAM (SDRAM), static RAM (SRAM), read only memory (ROM), flash memory, and/or any other type of non-transitory computer-readable medium. In many embodiments, DMC 170 provides data transfers to and from high-density DDR3 or DDR4 DRAM memory.

Figure 1B:
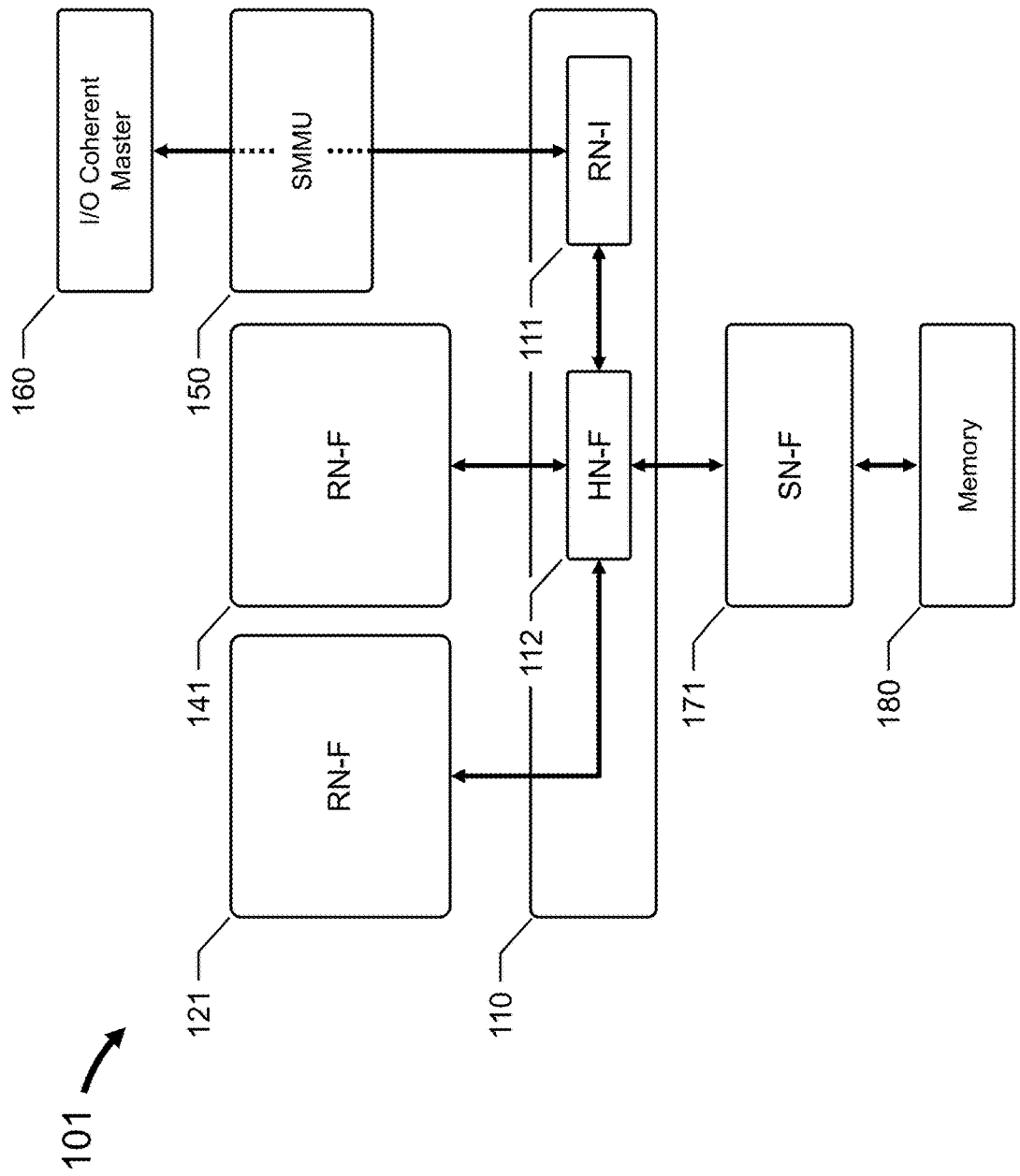
FIG. 1B depicts a block diagram for the system depicted in FIG. 1A using protocol node nomenclature, in accordance with an embodiment of the present disclosure.

FIG. 1B depicts a block diagram for system 100 using protocol node nomenclature, in accordance with an embodiment of the present disclosure.

A requester (e.g., a source of transactions) is represented by a Request Node (RN), which is a protocol node that generates transactions for coherent interconnect 110, such as, for example, memory read transactions, memory write transactions, I/O data transactions, etc. An RN-F protocol node is a "fully" coherent requester, and an RN-I protocol node represents an "I/O" coherent requester. CPU 120 is a fully coherent requester, so RN-F 121 represents CPU 120. Similarly, GPU 140 is a fully coherent requester, so RN-F 141 represent GPU 140. Each RN-I is associated with an I/O coherent master device 160 that is connected to coherent interconnect 110 via SMMU 150, and includes a microprocessor, microcontroller, ASIC, FPGA, logic circuits, etc., to provide the relevant functionality. In some embodiments, RN-Is may use the same hardware. I/O coherent master device 160 is an I/O coherent requester, so RN-I 111 represents I/O coherent master device 160.

In this embodiment, coherent interconnect 110 includes at least one completer, and each completer includes a microprocessor, microcontroller, ASIC, FPGA, logic circuits, etc., to provide the relevant functionality. Each completer is associated with a Home Node (HN), which is a protocol node that receives transactions from RNs, and may receive transactions from Slave Nodes (SNs), as described below. Similar to RNs, an HN-F protocol node represents a fully coherent completer, and an HN-I protocol node represents an I/O coherent completer.

In many embodiments, system 100 includes multiple HN-Fs 112, and each HN-F 112 manages a portion of the physical address space for memory 180. In certain embodiments, one HN-F 112 manages all of the physical address space for memory 180. Each HN-F may include a system level cache and a snoop traffic filter, and acts as the Point-of-Coherency (PoC) and Point of Serialization (PoS) for requests sent to that HN-F from RN-Fs and RN-Is. To avoid conflicts when multiple RNs attempt to access the same memory address within memory 180, HN-F 112 acts as the PoS, processing memory read transactions, memory write transactions, etc., in a serial manner.

A fully coherent slave device may be represented by an SN-F node, which is a protocol node that receives and completes requests from the HN-Fs. DMC 170 is a fully coherent slave device, so SN-F 171 represent memory controllers 170. In many embodiments, each HN-F 112 is associated with an SN-F 171, and each SN-F 171 is represented by one or more HN-Fs 112.

FIGS. 2A to 2C depict virtual address space to physical address space mappings, in accordance with embodiments of the present disclosure.

As discussed above, the memory address space for system 100 may be divided into a virtual address space and a physical address space. Generally, each process executing on CPU 120 or GPU 140, I/O coherent master device 160, etc., has a virtual address space that is mapped to a physical address space by one or more translation tables 182 (e.g., page tables). Translation tables 182 are managed by software, such as an OS or a hypervisor, and may be changed based on the requirements of the processes executing on CPU 120, GPU 140, I/O coherent master device 160, etc.

FIG. 2A depicts a single-level mapping 102, in accordance with an embodiment of the present disclosure. In this mapping, each TCI is associated with a different Level 1 translation table 182 that maps virtual address space 20 to physical address space 30. Virtual address space 20 is divided into N equal-sized blocks 22 (e.g., pages), and physical address space 30 is divided into N equal-sized blocks 32 (e.g., page frames or frames). Each block 22 represents a particular range of virtual memory addresses and each block 32 represents a range of physical memory addresses, such as, for example, a 4 KB (i.e., $2^{12}$) range of memory addresses, a 64 KB (i.e., $2^{16}$) range of memory addresses, a 2 MB (i.e., $2^{21}$) range of memory addresses, etc. In one example, a 32-bit virtual address space with a 12-bit block size (e.g., page size) is divided into 1,048,576 (i.e., $2^{20}$) blocks, and a corresponding 32-bit physical address space with a 12-bit block size (e.g., frame size) is divided into 1,048,576 (i.e., $2^{20}$) blocks.

Level 1 translation table 182 includes N table entries 183, i.e., one table entry 183 for each block. Each table entry 183 stores a physical memory address that corresponds to a virtual memory address as well as the attributes to use when accessing the physical memory address. More particularly, the physical memory address stored in each table entry 183 is the starting physical memory address for a range of physical memory addresses (i.e., a block). The first table entry 183 (i.e., Entry 0) provides the mapping for virtual address space Block 0, the second table entry 183 (i.e., Entry 1) provides the mapping for virtual address space Block 1, etc. In this mapping example, virtual address space Block 0 is mapped to physical address space Block 0, virtual address space Block 1 is mapped to physical address space Block 2, etc.

In the address space example above, the first range of virtual memory addresses, i.e., Block 0, starts at 0 (i.e., 0x00000000) and ends at 4,095 (i.e., 0x00000FFF), the second range of virtual memory addresses, i.e., Block 1, starts at 4,096 (i.e., 0x00001000) and ends at 8,191 (i.e., 0x00001FFF), the third range of virtual memory addresses, i.e., Block 2, starts at 8,192 (i.e., 0x0002000) and ends at 12,287 (i.e., 0x00002FFF), etc. Similarly, the first range of physical memory addresses, i.e., Block 0, starts at 0 (i.e., 0x00000000) and ends at 4,095 (i.e., 0x00000FFF), the second range of physical memory addresses, i.e., Block 1, starts at 4,096 (i.e., 0x00001000) and ends at 8,191 (i.e., 0x00001FFF), the third range of physical memory addresses, i.e., Block 2, starts at 8,192 (i.e., 0x0002000) and ends at 12,287 (i.e., 0x00002FFF), etc. Applied to the mapping example above, the first table entry 183 (i.e., Entry 0) stores the starting physical memory address of physical memory space Block 0 (e.g., 0), the second table entry 183 (i.e., Entry 1) stores the starting physical memory address of physical memory space Block 2 (e.g., 8,192), etc.

In many embodiments, a hierarchical, multi-level mapping provides efficiency and flexibility through various combinations of levels, translation tables and translation table block sizes. Generally, a shallow hierarchy with fewer levels and larger-sized translation table blocks requires fewer translation table lookups and is more efficient to cache in the TLBs, while a deeper hierarchy with more levels and smaller-sized translation table blocks provides fine-grain control over memory allocation but requires more translation table lookups and is less efficient to cache in the TLBs.

FIG. 2B depicts a two-level mapping 103, in accordance with an embodiment of the present disclosure. In this mapping, each TCI is associated with a different set of translation tables, including one Level 1 translation table 182 and one or more Level 2 translation tables 184, that maps virtual address space 20 to physical address space 30. Level 1 translation table 182 divides the virtual address space into a number (e.g., M−1) of large blocks, and each Level 2 translation table 184 divides a single large block from Level 1 translation table 182 into a number (e.g., O−1, P−1, etc.) of small blocks. Each entry in the Level 1 translation table 182 stores either a physical memory address that corresponds to a virtual memory address, or a physical memory address that corresponds to a Level 2 translation table 184. Each entry in a Level 2 translation table 184 stores a physical memory address that corresponds to a portion (i.e., small block) of the virtual memory address of a large block from the Level 1 translation table 182. The respective attributes to use when accessing the physical memory address are also stored with each physical memory address.

A three-level mapping is simply an extension of two-level mapping 103, and four-level mapping 104 is simply an extension of the three-level mapping.

FIG. 2C depicts a four-level mapping 104, in accordance with an embodiment of the present disclosure. In this mapping, each TCI is associated with a different set of translation tables including one Level 1 translation table, one or more Level 2 translation tables 184, one or more Level 3 translation tables 188. Level 1 translation table 182 divides the virtual address space into a number (e.g., M−1) of large blocks, each Level 2 translation table 184 divides a single large block from Level 1 translation table 182 into a number (e.g., O−1, P−1, etc.) of medium blocks, each Level 3 translation table 186 divides a single medium block from one of the Level 2 translation tables 184 into a number (e.g., Q−1, etc.) of small blocks, and each Level 4 translation table 188 divides a single small block from one of the Level 3 translation tables 186 into a number (e.g., R−1, etc.) of smallest blocks. In certain embodiments, the smallest block is known as a granule, with a size of 4 KB, 16 KB or 64 KB.

Each entry in the Level 1 translation table 182 stores either a physical memory address that corresponds to a virtual memory address, or a physical memory address that corresponds to a Level 2 translation table 184. Each entry in a Level 2 translation table 184 stores either a physical memory address that corresponds to a portion (i.e., medium block) of the virtual memory address of a large block from the Level 1 translation table 182, or a physical memory address that corresponds to a Level 3 translation table 186. Each entry in a Level 3 translation table 186 stores either a physical memory address that corresponds to a portion (i.e., small block) of the virtual memory address of a medium block from the Level 2 translation table 184, or a physical memory address that corresponds to a Level 4 translation table 188. Each entry in a Level 4 translation table 188 stores a physical memory address that corresponds to a portion (i.e., smallest block) of the virtual memory address of a small block from the Level 3 translation table 186. The respective attributes to use when accessing the physical memory address are also stored with each physical memory address.

Figure 3:
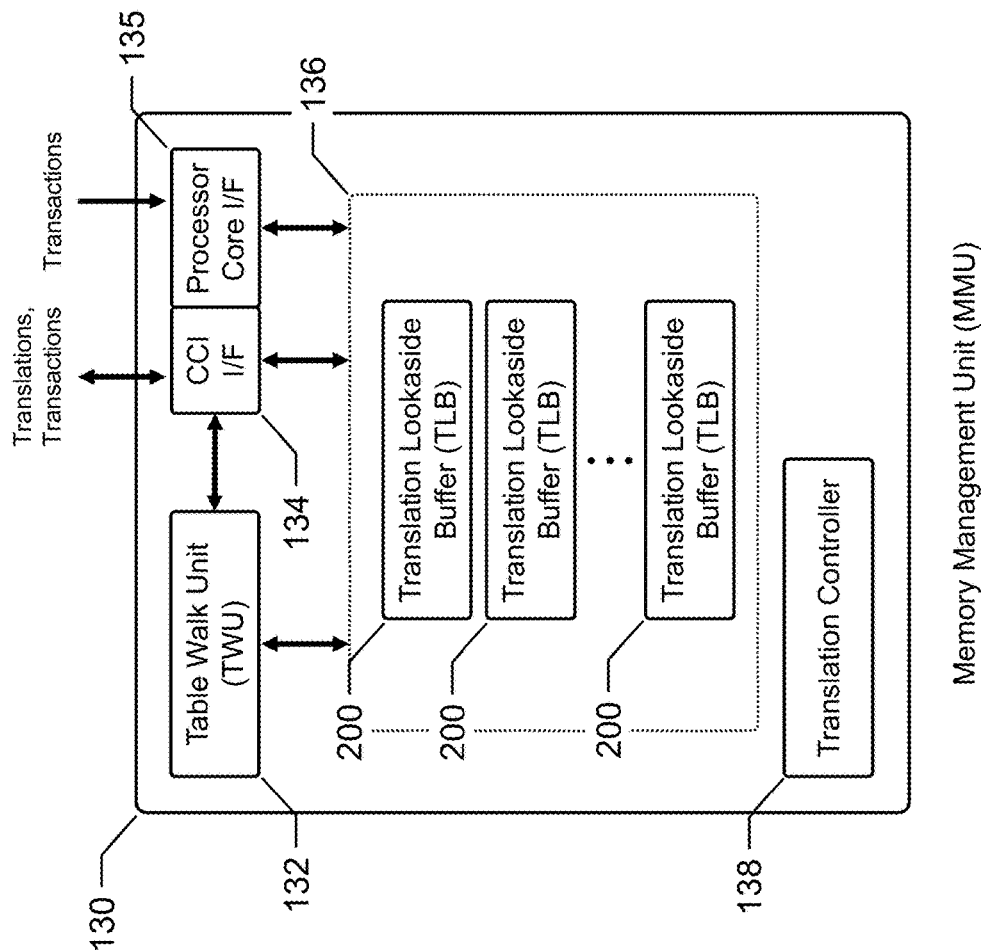
FIG. 3 depicts an MMU, in accordance with an embodiment of the present disclosure.

FIG. 3 depicts MMU 130, in accordance with an embodiment of the present disclosure.

MMU 130 includes table walk unit (TWU) 132, CCI interface (I/F) 134, processor core interface (I/F) 135, TLB memory 136, and translation controller 138. TLB memory 136 includes a number of TLBs 200. TWU 132 is coupled to CCI interface 134 and TLB memory 136. CCI interface 134 is coupled to coherent interconnect 110 and TLB memory 136. Processor core interface 135 is coupled to the processor cores of CPU 120, GPU 140, etc., and TLB memory 136. Translation controller 138 is coupled to TWU 132, CCI interface 134, processor core interface 135, and TLB memory 136.

TWU 132 includes a microprocessor, microcontroller, ASIC, FPGA, logic circuits, etc., and is configured to read configuration tables 181 and translation tables 182 from memory 180, and, in certain embodiments, store table walk results in local walk caches. For example, a first walk cache may be reserved for Level 1 translation table 182 entries, a second walk cache may be reserved for Level 2 translation table 184 entries, etc.

CCI interface 134 includes the appropriate circuitry to support the communication of transactions from CPU 120 to coherent interconnect 110 over an AMBA 5 CHI connection, from GPU 140 to coherent interconnect 110 over an ACE5-LiteDVM connection, etc. As noted above, other communication protocols may also be used. Processor core interface 135 includes the appropriate circuitry to support the communication of transactions from the processor cores of CPU 120, GPU 140, etc., to MMU 130.

TLB memory 136 includes DRAM, embedded DRAM, SRAM, etc., and includes a number of TLBs 200. Each TLB 200 is a cache that is configured to store address translations in a number of cache lines or TLB entries. In many embodiments, TLB 200 is a 4-way set associative cache, while in other embodiments, TLB 200 includes a micro TLB and a main TLB. The micro TLB is a smaller, fully associative cache that is searched first, while the main TLB is a 4-way set associative cache that is searched when a matching address translation is not found in the micro TLB.

Translation controller 138 includes a microprocessor, microcontroller, ASIC, FPGA, logic circuits, etc., and is configured to manage TWU 132, CCI interface 134, processor core interface 135 and TLBs 200, process incoming transactions from the processor cores and translate virtual memory addresses into physical memory addresses, manage address translations, send outgoing transactions with translated memory addresses to coherent interconnect 110, etc.

When MMU 130 receives a transaction with a virtual memory address and a TCI from a processor core via processor core interface 135, translation controller 138 searches for a matching address translation in TLBs 200. When a matching address translation is found, translation controller 138 translates the virtual memory address of the transaction and outputs the transaction via CCI interface 134. When a matching address translation is not found, translation controller 138 instructs TWU 132 to issue a sequence of memory read transactions to memory 180, via CCI interface 134, to perform configuration table walks and translation table walks. Configuration table walks return configuration information for the TCI from configuration tables 181, while translation table walks return address translation information for the TCI from translation tables 182. Walk caches within TWU 132 store table walk results, and reduce the number of table walks that are performed. For example, a first walk cache may be reserved for Level 1 translation table 182 entries, a second walk cache may be reserved for Level 2 translation table 184 entries, etc. The address translation is then stored in one or more TLBs 200.

Figure 4:
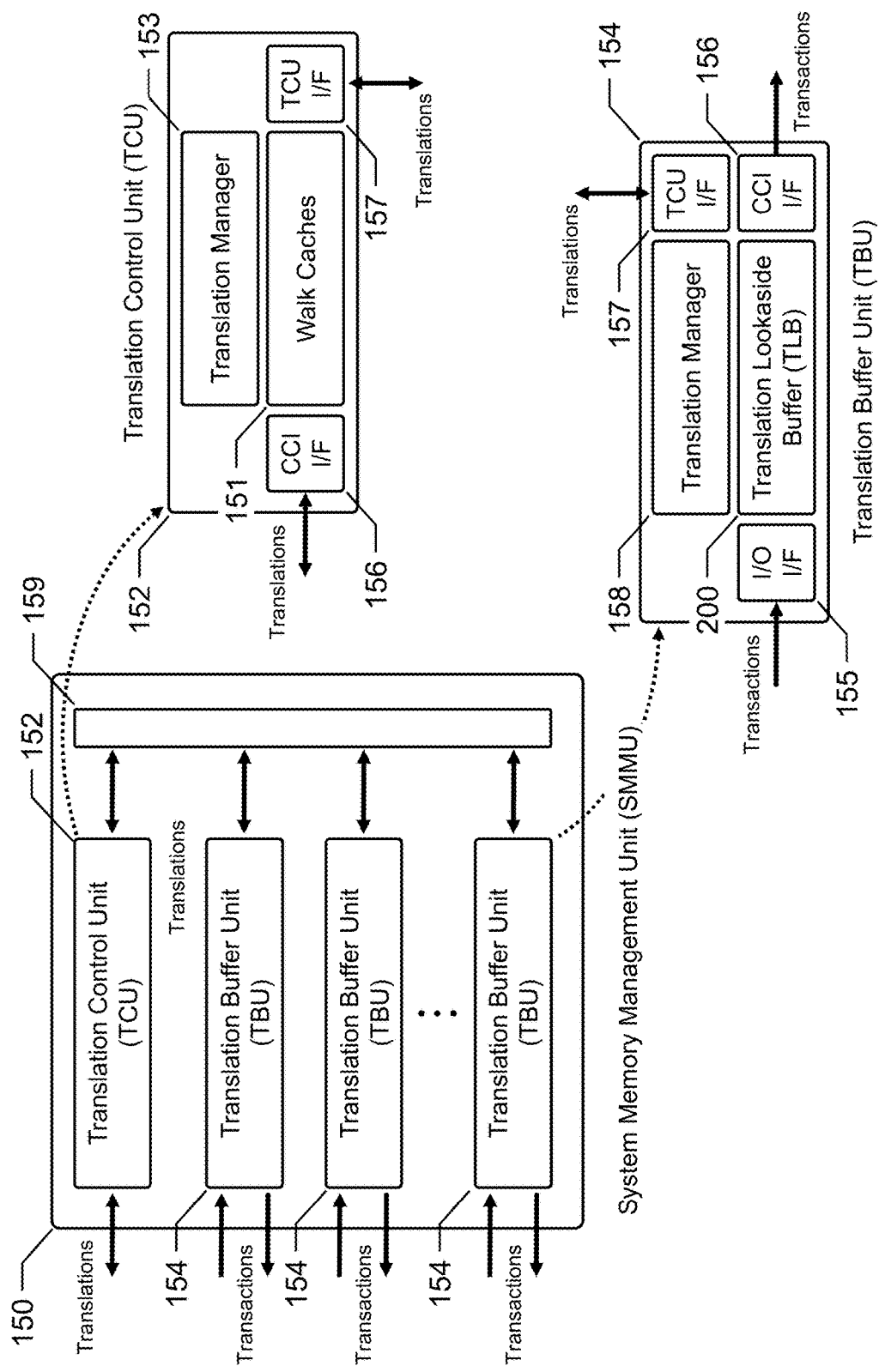
FIG. 4 depicts an SMMU, in accordance with an embodiment of the present disclosure.

FIG. 4 depicts SMMU 150, in accordance with an embodiment of the present disclosure.

SMMU 150 includes translation control unit (TCU) 152 coupled to a number of translation buffer units (TBUs) 154 via local interconnect 159. TCU 152 is configured to control and manage address translations, and includes, inter alia, translation manager 153, local walk caches 151, CCI interface (I/F) 156 and local interconnect or TCU interface (I/F) 157. Each TBU 154 is configured to cache address translations for a I/O coherent master device 160, and includes, inter alia, I/O interface (I/F) 155, CCI interface 156, local interconnect or TCU interface 157, translation manager 158 and TLB 200. I/O interface 155 is coupled to the I/O coherent master device 160.

Each TLB 200 is a cache that is configured to store address translations in a number of cache lines or TLB entries. In many embodiments, TLB 200 is a 4-way set associative cache, while in other embodiments, TLB 200 includes a micro TLB and a main TLB. The micro TLB is a smaller, fully associative cache that is searched first, while the main TLB is a larger, 4-way set associative cache that is searched when a matching address translation is not found in the micro TLB.

When a TBU 154 receives a transaction with a virtual memory address and a TCI from an I/O coherent master device 160 via I/O interface 155, translation manager 158 searches for a matching address translation in TLB 200. When a matching address translation is found, translation manager 158 translates the virtual memory address of the transaction into a physical memory address and outputs the transaction via CCI interface 156. When a matching address translation is not found, translation manager 158 sends an address translation request to TCU 152 via TCU interface 157.

When TCU 152 receives an address translation request via TCU interface 157, translation manager 153 issues a sequence of memory read transactions to memory 180, via CCI interface 156, to perform configuration table walks and translation table walks. Configuration table walks return configuration information for the TCI from configuration tables 181, while translation table walks return address translation information for the TCI from translation tables 182. Walk caches 151 store table walk results, and reduce the number of table walks that are performed. For example, a first walk cache may be reserved for Level 1 translation table 182 entries, a second walk cache may be reserved for Level 2 translation table 184 entries, etc. TCU 152 then sends the address translation to the requesting TBU 154, which is stored in TLB 200.

Figure 5:
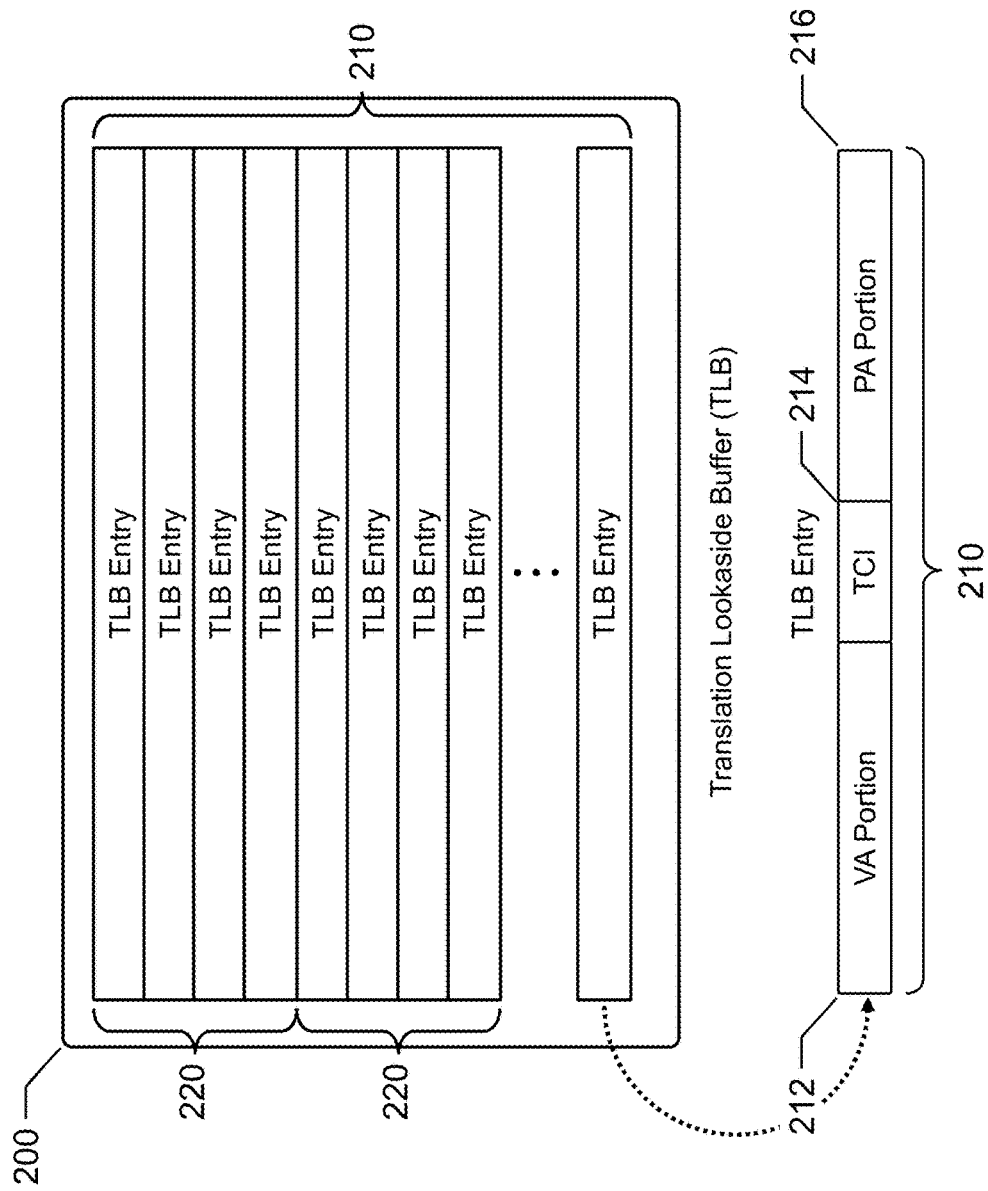
FIG. 5 depicts a TLB, in accordance with an embodiment of the present disclosure.

FIG. 5 depicts TLB 200, in accordance with an embodiment of the present disclosure.

TLB 200 includes a number of cache lines or TLB entries 210, and each TLB entry 210 stores an address translation. Generally, TLB 200 may be a fully-associative cache or an N-way set associative cache. A fully-associative cache may store an address translation in any TLB entry 210. An N-way set associative cache may store an address translation in one of N TLB entries 210 within a particular set of TLB entries 210. An N-way set associative cache may include 2 ways, 4 ways, 8 ways, etc. For illustration purposes, a 4-way set associative cache is depicted in FIG. 5; each set 220 includes 4 ways, i.e., 4 TLB entries 210. The size of TLB 200 is generally indicated by the number of entries and the associativity of the cache, such as, for example, a 64 entry fully-associative TLB, a 512 entry 4-way set associative TLB, etc.

Each address translation includes at least a portion of a virtual memory address (VA portion) 212, a TCI 214 and a portion of a physical memory address (PA portion) 216 to which the portion of the virtual memory address 212 is mapped. PA portion 216 may also be known as a PA base address. Generally, VA portion 212 is a virtual address space block number, while PA portion 216 is a physical address space block number. In many embodiments, VA portion 212 is a virtual page number, and PA portion 216 is a physical page number.

Figure 6:
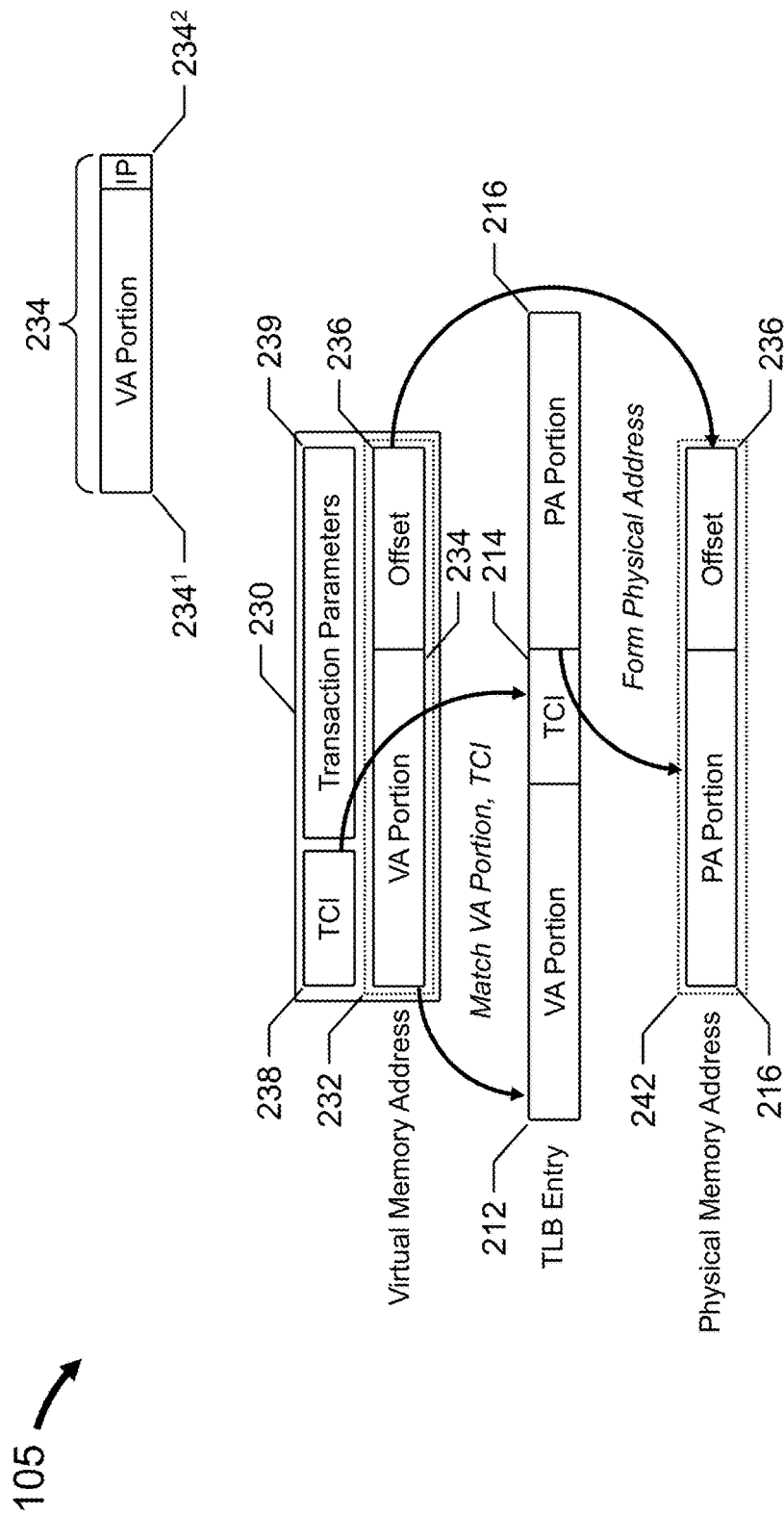
FIG. 6 depicts a process for generating a physical memory address for a transaction from a TLB entry, in accordance with an embodiment of the present disclosure.

FIG. 6 depicts a process 105 for generating a physical memory address for a transaction from a TLB entry, in accordance with an embodiment of the present disclosure.

Transaction 230 includes virtual memory address 232, TCI 238 and transaction parameters 239. After transaction 230 is received at an MMU 130, translation controller 138 searches one or more TLBs 200 for a matching address translation. Similarly, after a transaction is received at a TBU 154 of SMMU 150, translation manager 158 searches TLB 200 for a matching address translation. For each TLB 200 that is searched, translation controller 138 or translation manager 158 determines whether a TLB entry 210 stores the address translation by parsing virtual memory address 232 into virtual memory address (VA) portion 234 and offset 236 according to the cache mapping scheme, and then comparing VA portion 234 to VA portion 212 of that TLB entry 210. If VA portion 234 matches VA portion 212, TCI 238 is then compared to TCI 214. If the TCI 238 matches TCI 214, then the address translation is used to form physical memory address 242 for transaction 230 by combining PA portion 216 of the address translation and offset 236 of transaction 230.

If an address translation is not found within the TLBs 200 that are searched, then at least one of the TLB entries 210 from one of the TLBs 200 is identified according to a cache or TLB replacement policy and evicted, the address translation is determined by performing table walks through configuration tables 181 and translation tables 182 stored in memory 180, and the address translation is then stored in the identified TLB entry 210.

For a fully-associative cache, virtual memory address 232 is parsed into VA portion 234 and offset 236. VA portion 234 identifies a virtual address space block number, a virtual page number, etc. Offset 236 identifies the offset from the beginning of VA portion 234; in other words, offset 236 is an index into the virtual address space block, the virtual page, etc., and depends on the virtual block size, virtual page size, etc.

For an N-way set associative cache, virtual memory address 232 is parsed into VA portion 234 and offset 236, and VA portion 234 is further parsed into VA portion $234^1$ and index portion $234^2$. VA portion $234^1$ identifies a number of virtual address space blocks, a number of virtual pages, etc., and index portion $234^2$ identifies the specific set 220 of TLB entries 210 in which the address translation may be stored. VA portion $234^1$ is, of course, smaller than VA portion 234 and depends upon the number of ways, N. However, VA portion 212 and PA portion 216 are the same size as VA portion 234¹.

In some embodiments, system 100 has a 32-bit virtual memory address space (i.e., $2^{32}$ virtual memory addresses), a 32-bit physical memory address space (i.e., $2^{32}$ physical memory addresses), and each 32-bit memory address identifies a byte stored in memory 180. Other embodiments may combine different size address spaces, such as, for example, a 64-bit virtual memory address space and a 52-bit physical memory address space, etc.

In a fully-associative cache using 32-bit virtual and physical address spaces and 4 KB (i.e., 12-bit) virtual and physical block or page sizes, the size of VA portion 212 and VA portion 234 are 20 bits (i.e., 32–12=20 bits), which are the 20 most significant bits (MSBs) of the virtual memory address. In a 4-way set associative cache using 32-bit virtual and physical address spaces and 4 KB (i.e., 12-bit) virtual and physical block or page sizes, the size of index portion 234² is 2-bits, and the size of VA portion 212 and VA portion 234¹ are 18 bits (i.e., 32–12–2=18 bits), which are the 18 most significant bits (MSBs) of the virtual memory address.

Generally, a source of transactions, such as a process executing on CPU 120, GPU 140, I/O coherent master device 160, etc., may issue a sequence of memory transactions that include the same virtual memory address and the same translation context identifier (TCI). The TCI is used to identify the translation table or tables that are associated with the process and accessed by MMU 130 or SMMU 150 during the determination of the address translation. For example, the TCI may be an address space identifier (ASID), etc. A process may have a unique TCI, or a process may share a TCI with one or more other processes to form a translation context.

MMU 130 or SMMU 150 determines the address translation for the first memory transaction in the sequence, stores the address translation in at least one address translation cache, such as TLB 200, and then uses the stored address translation for each subsequent memory transaction in the sequence. After the process issues the last memory transaction in the sequence, the address translation is no longer needed. The process then issues a set-aside translation transaction, and, in response to receiving the set-aside translation transaction, MMU 130 or SMMU 150 deallocates the cache line (or lines) that stores the address translation, such as a TLB entry (or entries) 210.

The set-aside translation transaction indicates that a particular address translation is no longer needed by a source of transactions and may be removed from each address translation cache, such as TLB 200, in which the address translation is stored. The set-aside translation transaction advantageously improves the speed, performance and flexibility of MMU 130 and SMMU 150.

In one embodiment, deallocating the cache line includes immediately evicting the cache line, such as immediately evicting a TLB entry 210 from a TLB 200. In other embodiments, deallocating the cache line includes identifying the cache line for eviction at a later time, such as identifying a TLB entry 210 for eviction at a later time. For example, MMU 130 or SMMU 150 may identify the cache line (e.g., TLB entry 210) as invalid and subsequently evict the cache line (e.g., TLB entry 210) based on a cache line or TLB entry replacement policy. In another example, MMU 130 or SMMU 150 may identify the cache line (e.g., TLB entry 210) as not likely to be used and subsequently evict the cache line (e.g., TLB entry 210) based on the cache line or TLB entry replacement policy.

In certain embodiments, the set-aside translation transaction complements a "stash-translation" transaction. In these embodiments, the source of transactions issues the stash-translation transaction to prefetch the address translation that will be needed by a subsequent sequence of memory transactions. The stash-translation transaction includes the same virtual memory address and the same translation context identifier as the sequence of memory transactions. In response to receiving the stash-translation transaction, MMU 130 or SMMU 150 determines and stores the address translation in at least one address translation cache, such as a TLB 200. MMU 130 or SMMU 150 then accesses the stored address translation for each memory transaction in the sequence. After the process issues the last memory transaction in the sequence, the address translation is no longer needed, and the process then issues the set-aside translation transaction as an "unstash-translation" transaction. In response to receiving the unstash-translation transaction, MMU 130 or SMMU 150 deallocates each cache line or TLB entry 210 that stores the "stashed" address translation.

In response to receiving the stash-translation transaction, MMU 130 or SMMU 150 may send a stash translation transaction response to the source of transactions without sending the stash-translation transaction to memory 180. The stash-translation transaction response indicates that the address translation has been stored in at least one address translation cache or TLB 200. Similarly, in response to receiving the set-aside translation transaction, MMU 130 or SMMU 150 may send a set-aside translation transaction response to the source of transactions without sending the set-aside translation transaction to memory 180. The set-aside translation transaction response indicates that the address translation has been deallocated from one or more of the address translation caches or TLBs 200.

After receiving the stash-translation transaction response, the source of transactions may send the first memory transaction to MMU 130 or SMMU 150. Generally, the source of transactions receives memory transaction responses from memory 180, which include a first memory transaction response and a last memory transaction response. After receiving the last memory transaction response, the source of transactions may send the set aside translation transaction to MMU 130 or SMMU 150. And, after receiving the set-aside translation transaction response, the source of transactions may send a new stash-translation transaction to MMU 130 or SMMU 150.

The set-aside translation transaction advantageously enhances real-time sensitive systems by ensuring that prefetched translations do not replace other address translations that are in use or soon to be used, thereby providing more reliable, real-time system performance.

Figure 7A:
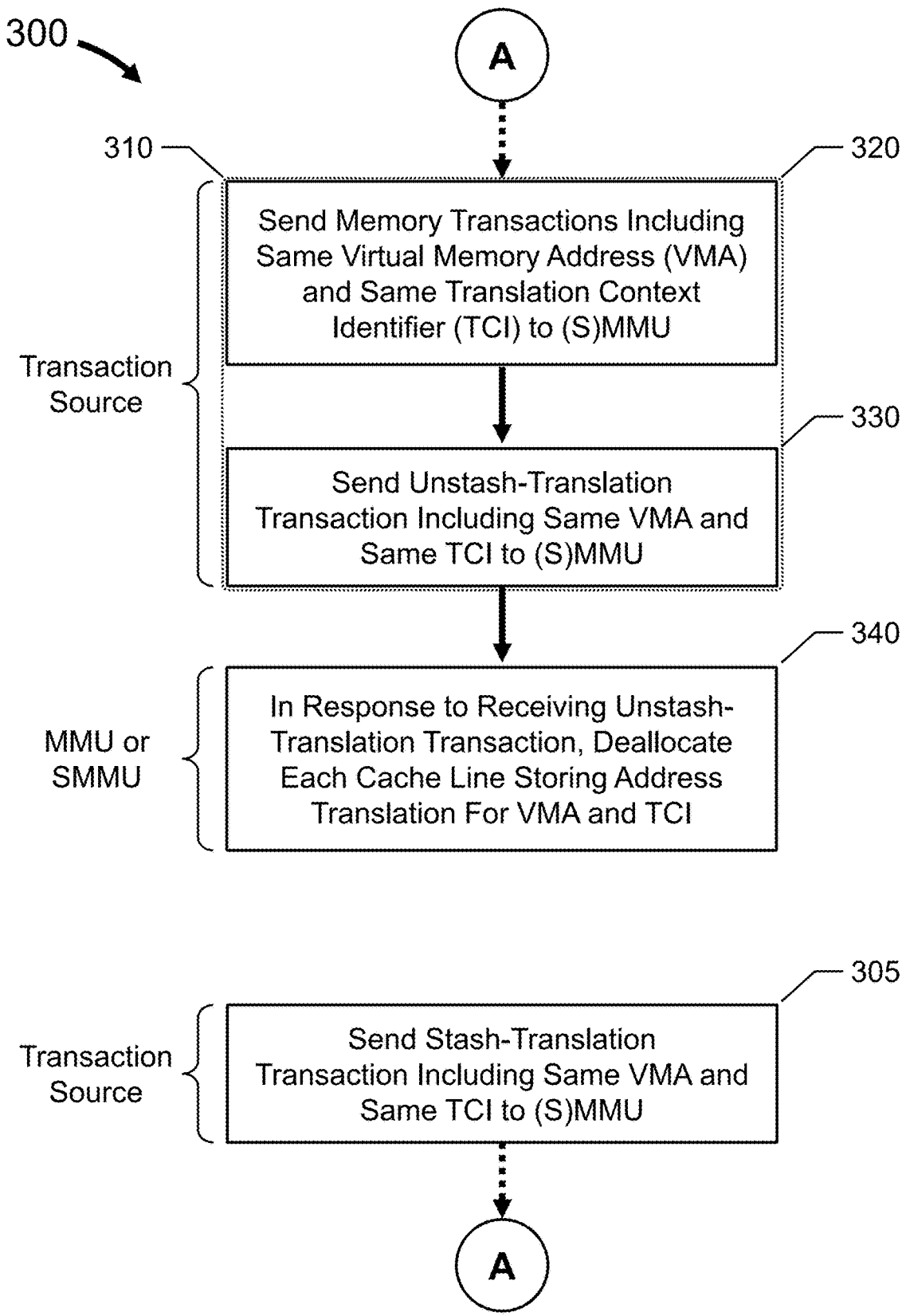
FIGS. 7A and 7B depict flow diagrams representing functionality associated with invalidating cache lines in an address translation cache, in accordance with embodiments of the present disclosure.

FIG. 7A depicts a flow diagram 300 representing functionality associated with invalidating cache lines in an address translation cache, in accordance with embodiments of the present disclosure.

In many embodiments, the functionality associated with invalidating cache lines in an address translation cache is represented by blocks 310, 320, 330 and 340.

At 310, a source of transactions sends transactions to a memory management unit, such as MMU 130 or SMMU 150. The memory management unit has one or more address translation caches, such as TLBs 200, and each address translation cache has a number of cache lines, such as TLB entries 210. The transactions include memory transactions and a set-aside translation transaction. Block 310 includes blocks 320 and 330.

At 320, the source of transactions sends the memory transactions to the memory management unit. The memory transactions include at least a first memory transaction and a last memory transaction, and each memory transaction includes the same virtual memory address and the same translation context identifier or TCI. Consequently, the memory management unit will access the same cache line or TLB entry 210 to translate the address of each memory transaction.

At 330, the source of transactions sends the set-aside translation transaction to the memory management unit. The set-aside translation transaction includes the same virtual memory address and the same translation context identifier or TCI as the memory transactions.

At 340, in response to receiving the set-aside translation transaction from the source of transactions, the memory management unit deallocates each cache line that stores an address translation for the same virtual memory address and the same translation context identifier or TCI.

In certain embodiments, the functionality associated with invalidating cache lines in an address translation cache also includes block 305, which precedes block 310.

At 305, the source of transactions sends a stash-translation transaction to the memory management unit. The stash-translation transaction includes the same virtual memory address and the same translation context identifier or TCI as the memory transactions, and causes the memory management unit to prefetch the address translation that will be needed by the memory transactions.

Figure 7B:
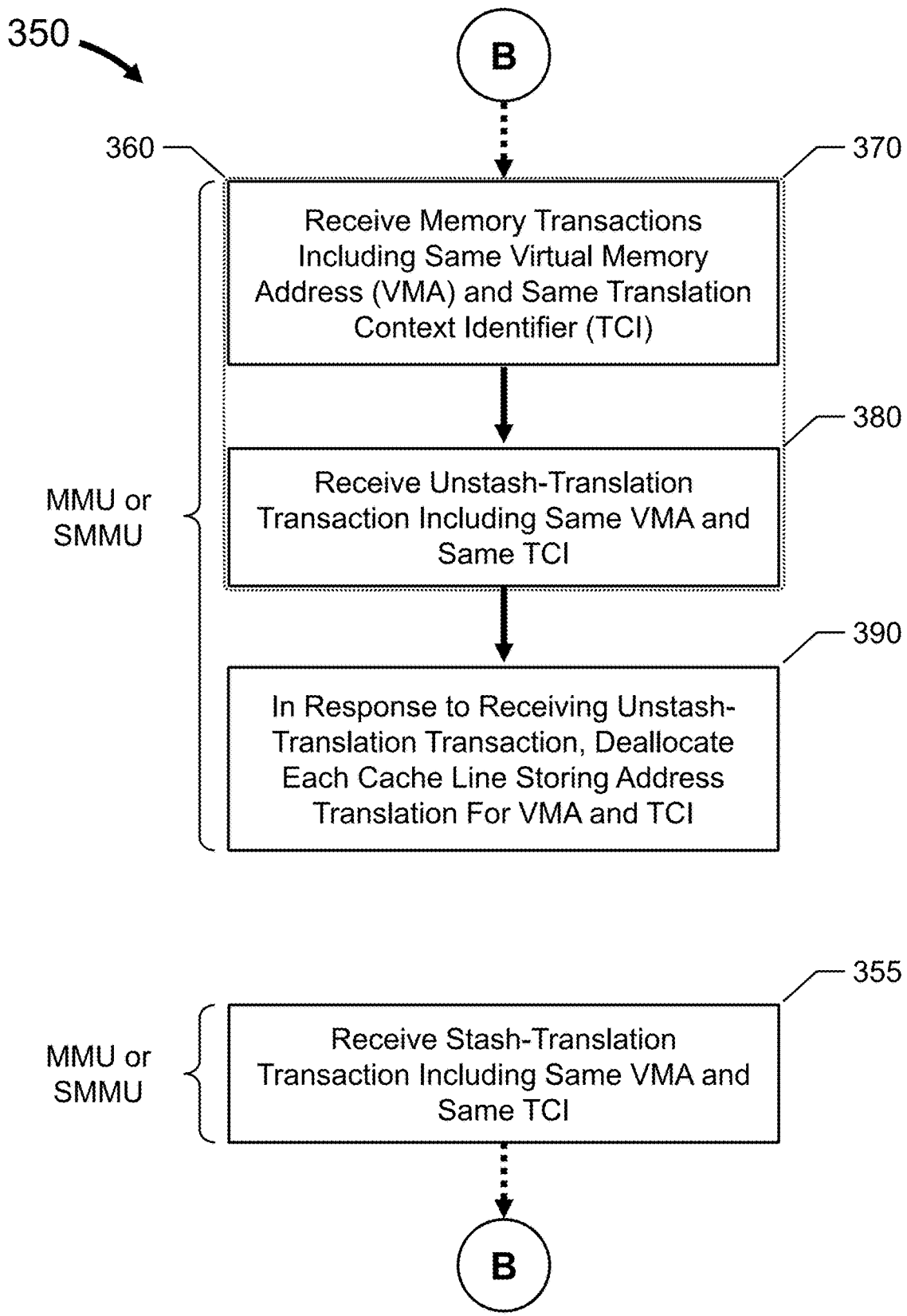

FIG. 7B depicts a flow diagram 350 representing functionality associated with invalidating cache lines in an address translation cache, in accordance with embodiments of the present disclosure.

In many embodiments, the functionality associated with invalidating cache lines in an address translation cache is represented by blocks 360, 370, 380 and 390.

At 360, a memory management unit, such as MMU 130 or SMMU 150, receives transactions from a source of transactions. The memory management unit has one or more address translation caches, such as TLBs 200, and each address translation cache has a number of cache lines, such as TLB entries 210. The transactions include memory transactions and a set-aside translation transaction. Block 360 includes blocks 370 and 380.

At 370, the memory management unit receives the memory transactions. The memory transactions include at least a first memory transaction and a last memory transaction, and each memory transaction includes the same virtual memory address and the same translation context identifier or TCI. Consequently, the memory management unit will access the same cache line or TLB entry 210 to translate the address of each memory transaction.

At 380, the memory management unit receives the set-aside translation transaction. The set-aside translation transaction includes the same virtual memory address and the same translation context identifier or TCI as the memory transactions.

At 390, in response to receiving the set-aside translation transaction from the source of transactions, the memory management unit deallocates each cache line that stores an address translation for the same virtual memory address and the same translation context identifier or TCI. Block 390 provides the same functionality as block 340 above.

In certain embodiments, the functionality associated with invalidating cache lines in an address translation cache also includes block 355, which precedes block 360.

At 355, the memory management unit receives a stash-translation transaction. The stash-translation transaction includes the same virtual memory address and the same translation context identifier or TCI as the memory transactions, and causes the memory management unit to prefetch the address translation that will be needed by the memory transactions.

In one embodiment, a method for invalidating cache lines in one or more address translation caches includes, at a source of transactions, sending transactions to a memory management unit having one or more address translation caches, each address translation cache having a plurality of cache lines, including sending memory transactions including at least a first memory transaction and a last memory transaction, each memory transaction including a same virtual memory address and a same translation context identifier; and sending a set-aside translation transaction including the same virtual memory address and the same translation context identifier. And, at the memory management unit, in response to receiving the set-aside translation transaction, deallocating each cache line that stores an address translation for the same virtual memory address and the same translation context identifier.

In another embodiment of the method, deallocating each cache line includes immediately evicting the cache line; identifying the cache line as invalid, and subsequently evicting the cache line based on a cache line replacement policy; or identifying the cache line as not likely to be used, and subsequently evicting the cache line based on the cache line replacement policy.

In another embodiment, method further includes, at the source of transactions, prior to sending the memory transactions, sending a stash-translation transaction including the same virtual memory address and the same translation context identifier; and, at the memory management unit, in response to receiving the stash-translation transaction, sending a stash translation transaction response to the source of transactions without sending the stash-translation transaction to a memory; and in response to receiving the set-aside translation transaction, sending a set-aside translation transaction response to the source of transactions without sending the set-aside translation transaction to the memory.

In another embodiment, method further includes, at the source of transactions, after receiving the stash-translation transaction response, sending the first memory transaction to the memory management unit.

In another embodiment, method further includes, at the source of transactions, receiving memory transaction responses from the memory, the memory transaction responses including a first memory transaction response and a last memory transaction response; and after receiving the last memory transaction response, sending the set aside translation transaction to the memory management unit.

In another embodiment, method further includes, at the source of transactions, after receiving the set-aside translation transaction response, sending a new stash-translation transaction to the memory management unit.

In another embodiment, method further includes, at the memory management unit, in response to receiving the first memory transaction, determining whether an address translation for the same virtual memory address and the same translation context identifier is stored in the address translation caches by comparing a portion of the same virtual memory address and the same translation context identifier with the address translations stored in each address translation cache; and when the address translation is not stored in the address translation caches, allocating a cache line for the address translation in one of the address translation caches including determining the address translation and storing the address translation in the cache line.

In another embodiment of the method, determining whether the address translation is stored in the address translation caches includes determining a physical memory base address corresponding to the portion of the same virtual memory address by searching one or more table walk caches, walking through translation tables stored in a memory, or a combination thereof; and generating the address translation based on the portion of the same virtual memory address, the same translation context identifier and the physical memory base address.

In another embodiment of the method, the source of transactions is a process executing on a master device, and the memory management unit is a system memory management unit; or the source of transactions is a process executing on a processor, and the memory management unit is a processor memory management unit.

In one embodiment, another method for invalidating cache lines in an address translation cache includes receiving transactions from a source of transactions at a memory management unit having one or more address translation caches, each address translation cache having a plurality of cache lines, including receiving memory transactions including at least a first memory transaction and a last memory transaction, each memory transaction including a same virtual memory address and a same translation context identifier, and receiving a set-aside translation transaction including the same virtual memory address and the same translation context identifier; and in response to receiving the set-aside translation transaction, deallocating each cache line that stores an address translation for the same virtual memory address and the same translation context identifier in one or more of the address translation caches.

In another embodiment of the method, deallocating each cache line includes immediately evicting the cache line; identifying the cache line as invalid, and subsequently evicting the cache line based on a cache line replacement policy; or identifying the cache line as not likely to be used, and subsequently evicting the cache line based on the cache line replacement policy.

In another embodiment, the method further includes in response to receiving a stash-translation transaction including the same virtual memory address and the same translation context identifier, sending a stash translation transaction response without sending the stash-translation transaction to a memory; and in response to receiving the set-aside translation transaction, sending a set-aside translation transaction response without sending the set-aside translation transaction to the memory.

In another embodiment, the method further includes, after sending the stash-translation transaction response, receiving the first memory transaction.

In another embodiment, the method further includes, after receiving the last memory transaction, receiving the set aside translation transaction.

In another embodiment, the method further includes, after sending the set-aside translation transaction response, receiving a new stash-translation transaction.

In another embodiment, the method further includes, in response to receiving the first memory transaction determining whether an address translation for the same virtual memory address and the same translation context identifier is stored in the address translation caches by comparing a portion of the same virtual memory address and the same translation context identifier with the address translations stored in each address translation cache; and when the address translation is not stored in the address translation caches, allocating a cache line for the address translation in one of the address translation caches including determining the address translation and storing the address translation in the cache line.

In another embodiment of the method, determining whether the address translation is stored in the address translation caches includes determining a physical memory base address corresponding to the portion of the same virtual memory address by searching one or more table walk caches, walking through translation tables stored in a memory, or a combination thereof; and generating the address translation based on the portion of the same virtual memory address, the same translation context identifier and the physical memory base address.

In one embodiment, a memory management unit includes a communication interface, one or more address translation caches, and a translation controller coupled to the communication interface and the address translation caches. The communication interface is configured to receive transactions that include memory transactions including at least a first memory transaction and a last memory transaction, each memory transaction including a same virtual memory address and a same translation context identifier, and a set-aside translation transaction that includes the same virtual memory address and the same translation context identifier. Each address translation cache includes a plurality of cache lines, each cache line configured to store an address translation for a virtual memory address and a translation context identifier. The translation controller is configured to, in response to receiving the set-aside translation transaction, deallocate each cache line that stores the address translation for the same virtual memory address and the same translation context identifier.

In another embodiment of the memory management unit, deallocate each cache line includes immediately evict the cache line; identify the cache line as invalid, and subsequently evict the cache line based on a cache line replacement policy; or identify the cache line as not likely to be used, and subsequently evict the cache line based on the cache line replacement policy.

In another embodiment of the memory management unit, the translation controller is configured to in response to receiving a stash-translation transaction including the same virtual memory address and the same translation context identifier, send a stash translation transaction response without sending the stash-translation transaction to a memory; and in response to receiving the set-aside translation transaction, send a set-aside translation transaction response without sending the set-aside translation transaction to the memory.

In another embodiment of the memory management unit, the translation controller is configured to after sending the stash-translation transaction response, receive the first memory transaction; after receiving the last memory transaction, receive the set aside translation transaction; and after sending the set-aside translation transaction response, receive a new stash translation transaction.

In another embodiment of the memory management unit, the translation controller is configured to, in response to receiving the first memory transaction, determine whether an address translation for the same virtual memory address and translation context identifier is stored in the address translation caches by comparing a portion of the same virtual memory address and the same translation context identifier with the address translations stored in each of the address translation caches; and when the address translation is not stored in the address translation caches, allocate a cache line for the address translation in one of the address translation caches including determine the address translation, and store the address translation in the cache line.

In another embodiment of the memory management unit, determine whether the address translation is stored in the address translation caches includes determine a physical memory base address corresponding to the portion of the same virtual memory address by searching one or more table walk caches, walking through translation tables stored in a memory, or a combination thereof; and generate the address translation based on the portion of the same virtual memory address, the same translation context identifier and the physical memory base address.

While implementations of the disclosure are susceptible to embodiment in many different forms, there is shown in the drawings and will herein be described in detail specific embodiments, with the understanding that the present disclosure is to be considered as an example of the principles of the disclosure and not intended to limit the disclosure to the specific embodiments shown and described. In the description above, like reference numerals may be used to describe the same, similar or corresponding parts in the several views of the drawings.

In this document, the terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "many embodiment," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," "for example," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The many features and advantages of the disclosure are apparent from the detailed specification, and, thus, it is intended by the appended claims to cover all such features and advantages of the disclosure which fall within the scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A method for invalidating cache lines in one or more address translation caches, comprising:
   at a source of transactions:
      sending transactions to a memory management unit having one or more address translation caches, each address translation cache having a plurality of cache lines, including:
         sending memory transactions including at least a first memory transaction and a last memory transaction, each memory transaction including a same virtual memory address and a same translation context identifier; and
         sending a set-aside translation transaction including the same virtual memory address and the same translation context identifier;
   at the memory management unit:
      in response to receiving the set-aside translation transaction, deallocating each cache line that stores an address translation for the same virtual memory address and the same translation context identifier.

2. The method according to claim 1, where said deallocating each cache line includes:
   immediately evicting the cache line;
   identifying the cache line as invalid, and subsequently evicting the cache line based on a cache line replacement policy; or
   identifying the cache line as not likely to be used, and subsequently evicting the cache line based on the cache line replacement policy.

3. The method according to claim 1, further comprising:
   at the source of transactions:

prior to sending the memory transactions, sending a stash-translation transaction including the same virtual memory address and the same translation context identifier;
at the memory management unit:
in response to receiving the stash-translation transaction, sending a stash-translation transaction response to the source of transactions without sending the stash-translation transaction to a memory; and
in response to receiving the set-aside translation transaction, sending a set-aside translation transaction response to the source of transactions without sending the set-aside translation transaction to the memory.

4. The method according to claim 3, further comprising:
at the source of transactions:
after receiving the stash-translation transaction response, sending the first memory transaction to the memory management unit.

5. The method according to claim 3, further comprising:
at the source of transactions:
receiving memory transaction responses from the memory, the memory transaction responses including a first memory transaction response and a last memory transaction response; and
after receiving the last memory transaction response, sending the set-aside translation transaction to the memory management unit.

6. The method according to claim 3, further comprising:
at the source of transactions:
after receiving the set-aside translation transaction response, sending a new stash-translation transaction to the memory management unit.

7. The method according to claim 1, further comprising at the memory management unit:
in response to receiving the first memory transaction:
determining whether an address translation for the same virtual memory address and the same translation context identifier is stored in the address translation caches by comparing a portion of the same virtual memory address and the same translation context identifier with the address translations stored in each address translation cache; and
when the address translation is not stored in the address translation caches, allocating a cache line for the address translation in one of the address translation caches including determining the address translation and storing the address translation in the cache line.

8. The method according to claim 7, where said determining whether the address translation is stored in the address translation caches includes:
determining a physical memory base address corresponding to the portion of the same virtual memory address by searching one or more table walk caches, walking through translation tables stored in a memory, or a combination thereof; and
generating the address translation based on the portion of the same virtual memory address, the same translation context identifier and the physical memory base address.

9. The method according to claim 1, where:
the source of transactions is a process executing on a master device, and the memory management unit is a system memory management unit; or
the source of transactions is a process executing on a processor, and the memory management unit is a processor memory management unit.

10. A method for invalidating cache lines in an address translation cache, comprising:
receiving transactions from a source of transactions at a memory management unit having one or more address translation caches, each address translation cache having a plurality of cache lines, including:
receiving memory transactions including at least a first memory transaction and a last memory transaction, each memory transaction including a same virtual memory address and a same translation context identifier, and
receiving a set-aside translation transaction including the same virtual memory address and the same translation context identifier; and
in response to receiving the set-aside translation transaction, deallocating each cache line that stores an address translation for the same virtual memory address and the same translation context identifier in one or more of the address translation caches.

11. The method according to claim 10, where said deallocating each cache line includes:
immediately evicting the cache line;
identifying the cache line as invalid, and subsequently evicting the cache line based on a cache line replacement policy; or
identifying the cache line as not likely to be used, and subsequently evicting the cache line based on the cache line replacement policy.

12. The method according to claim 10, further comprising:
in response to receiving a stash-translation transaction including the same virtual memory address and the same translation context identifier, sending a stash-translation transaction response without sending the stash-translation transaction to a memory; and
in response to receiving the set-aside translation transaction, sending a set-aside translation transaction response without sending the set-aside translation transaction to the memory.

13. The method according to claim 12, further comprising:
after sending the stash-translation transaction response, receiving the first memory transaction.

14. The method according to claim 12, further comprising:
after receiving the last memory transaction, receiving the set-aside translation transaction.

15. The method according to claim 12, further comprising:
after sending the set-aside translation transaction response, receiving a new stash-translation transaction.

16. The method according to claim 10, further comprising:
in response to receiving the first memory transaction:
determining whether an address translation for the same virtual memory address and the same translation context identifier is stored in the address translation caches by comparing a portion of the same virtual memory address and the same translation context identifier with the address translations stored in each address translation cache; and
when the address translation is not stored in the address translation caches, allocating a cache line for the address translation in one of the address translation caches including determining the address translation and storing the address translation in the cache line.

17. The method according to claim 16, where said determining whether the address translation is stored in the address translation caches includes:
- determining a physical memory base address corresponding to the portion of the same virtual memory address by searching one or more table walk caches, walking through translation tables stored in a memory, or a combination thereof; and
- generating the address translation based on the portion of the same virtual memory address, the same translation context identifier and the physical memory base address.

18. A memory management unit, comprising:
- a communication interface configured to receive transactions, the transactions including:
  - memory transactions including at least a first memory transaction and a last memory transaction, each memory transaction including a same virtual memory address and a same translation context identifier, and
  - a set-aside translation transaction that includes the same virtual memory address and the same translation context identifier;
- one or more address translation caches, each address translation cache including a plurality of cache lines, each cache line configured to store an address translation for a virtual memory address and a translation context identifier; and
- a translation controller, coupled to the communication interface and the address translation caches, configured to:
  - in response to receiving the set-aside translation transaction, deallocate each cache line that stores the address translation for the same virtual memory address and the same translation context identifier.

19. The memory management unit according to claim 18, where said deallocate each cache line includes:
- immediately evict the cache line;
- identify the cache line as invalid, and subsequently evict the cache line based on a cache line replacement policy; or
- identify the cache line as not likely to be used, and subsequently evict the cache line based on the cache line replacement policy.

20. The memory management unit according to claim 18, where the translation controller is configured to:
- in response to receiving a stash-translation transaction including the same virtual memory address and the same translation context identifier, send a stash-translation transaction response without sending the stash-translation transaction to a memory; and
- in response to receiving the set-aside translation transaction, send a set-aside translation transaction response without sending the set-aside translation transaction to the memory.

21. The memory management unit according to claim 20, where the translation controller is configured to:
- after sending the stash-translation transaction response, receive the first memory transaction;
- after receiving the last memory transaction, receive the set-aside translation transaction; and
- after sending the set-aside translation transaction response, receive a new stash-translation transaction.

22. The memory management unit according to claim 18, where the translation controller is configured to:
- in response to receiving the first memory transaction:
  - determine whether an address translation for the same virtual memory address and the same translation context identifier is stored in the address translation caches by comparing a portion of the same virtual memory address and the same translation context identifier with the address translations stored in each of the address translation caches; and
  - when the address translation is not stored in the address translation caches, allocate a cache line for the address translation in one of the address translation caches including determine the address translation, and store the address translation in the cache line.

23. The memory management unit according to claim 22, where said determine whether the address translation is stored in the address translation caches includes:
- determine a physical memory base address corresponding to the portion of the same virtual memory address by searching one or more table walk caches, walking through translation tables stored in a memory, or a combination thereof; and
- generate the address translation based on the portion of the same virtual memory address, the same translation context identifier and the physical memory base address.

* * * * *